United States Patent Office 2,792,436
Patented May 14, 1957

2,792,436

PRODUCTION OF MONOCYCLIC TERPENES WITH PARA-STRUCTURE FROM BICYCLIC TERPENES

Hugo Kroeper, Heidelberg, Wolfgang Rau, Heidelberg-Rohrbach, and Friedrich Wirth, Ludwigshafen (Rhine)-Oggersheim, Germany, assignors to Badische Anilin- & Soda - Fabrik Aktiengesellschaft, Ludwigshafen (Rhine), Germany No Drawing. Application August 13, 1956,
Serial No. 603,818

4 Claims. (Cl. 260—675.5)

This invention relates to an improved process for the production of monocyclic terpenes with parastructure by isomerization of bicyclic terpenes, in particular turpentine. It relates in particular to the production of alpha-terpinene or dipentene and also mixtures thereof by isomerization of turpentine while using a new catalyst having selective action.

It is already known that mixtures of para-cymene and camphene with small amounts of dipentene and terpinene are obtained by treating bicyclic terpenes with silicic acid, silicates or metal oxides, for example $Al_2O_3$ and $TiO_2$, at elevated temperature.

Attempts have also already been made to isomerize bicyclic terpenes, such as alpha- and beta-pinene, to monocyclic terpenes, in particular dipentene, in the presence of a thorium oxide catalyst deposited on pumice (Ind. Eng. Chem. 29 (1937), 49). This catalyst, however, does not lead to a unitary mixture of isomerization products and the isomerization mixture obtained therewith contains, in addition to unsatisfactory yields of dipentene, appreciable amounts of polymeric compounds, open-chain terpenes and other compounds.

It is also already known to carry out the isomerization of bicyclic terpenes by heating the initial material in the presence of a catalyst in an autoclave. According to the process known from the U. S. patent specification No. 2,393,915, the catalysts used are alkaline-reacting catalysts, while according to another known method (U. S. patent specification No. 2,097,744) working is in the presence of strong organic acids or phosphoric acid. The amount of dipentene obtained when using alkaline catalysts in the isomerization of pinene or turpentine, is not satisfactory and substantially corresponds to the yield which may be obtained by purely thermal isomerization of the initial material without the catalysts. (See Simonsen "The Terpenes," volume II (1949) and Journ. Am. Chem. Soc. 67 (1945), 242 and Journ. Am. Chem. Soc. 69 (1947), 319 to 322).

By exhaustive investigations by means of infra-red analysis it has been by no means possible to confirm the high yields of dipentene which are said to be obtainable with the acid catalysts, for example phosphoric acid, according to U. S. patent specification No. 2,097,744 while maintaining the conditions chosen therein in the examples.

Finally there is known from U. S. patent specification No. 2,551,361 an apparatus with which high yields of dipentene are to be obtained in continuous operation by purely thermal isomerization of pinene. It has been found, however, that also with this known apparatus no better yields of dipentene can be obtained.

In the following Table there are collected the results which are in fact obtained by the methods hitherto known for the production of monocyclic terpenes by isomerization of alpha-pinene or turpentine. The figures for the conversion and the yields of the individual compounds of the isomerization mixture have been determined by fine distillation and infra-red analysis:

| Catalyst used | Reaction time in hours | Isomerization temperature in ° C. | Conversion of the initial material in percent by weight | Reaction products in percent by weight with reference to converted initial material: | | | |
|---|---|---|---|---|---|---|---|
| | | | | Dipentene | Polymers | Pyrones | Allo-ocimene |
| 1. Thorium oxide on pumice (Ind. Eng. Chem. 29 (1937) 94). | 0.05 to 0.1 | 390–420 gas phase. | 100 | 30–35 | 20–30 | 20–25 | 10 |
| 2. Basic compounds (alkalies or amines in solution or undiluted—(U. S. Patent 2,393,915). | 2 (autoclave) | 250 | 100 | 40 | 20–25 | 15 | 15–20 |
| 3. Phosphoric acid—70%: (U. S. Patent 2,097,744). | 5 (autoclave) | 75 | 38 | | 7 | | |
| 4. Phosphoric acid—70%: (U. S. Patent 2,097,744). | 5 (autoclave) | 100 | 90 | | 20 | | |
| 5. Without catalyst (purely thermal isomerization according to U. S. Patent 2,551,361). | 2 (under pressure). | 250 | 90 | 40 | 20–25 | 15 | 15–20 |

It is one object of the present invention to increase the yields of monocyclic terpenes having para-structure, in particular of dipentene and alpha-terpinene, in the isomerization of bicyclic terpenes, in particular of turpentine.

A further object of the invention is to suppress the formation of polymeric compounds and open-chain terpenes as well as of those monocyclic terpenes which are not of para-structure or which contain more than two substituents on the ring skeleton.

We have found that monocyclic terpenes having para-structure selected from the group consisting of dipentene and alpha-terpinene are obtained by treating a bicyclic terpene selected from the group consisting of turpentine, alpha- and beta-pinenes at temperatures between 150° and 450° C. and pressures of 1 to 100 atmospheres with catalysts containing manganese oxide.

As catalysts there are suitable for example manganese dioxide, manganese (II) oxide, manganese (II, IV) oxide, which may be applied to inert carriers, such as active carbon, pumice or inactive aluminium oxide, or on surface-active substances, as for example silicic acid, kieselguhr, bentonite or fuller's earth. They may be obtained for example by impregnating the inert carrier or surface-active substance with a manganese salt, as for example carbonate or nitrate and subsequently heating it in a current of oxygen or air at 300° to 500° C. The finished catalyst preferably has a manganese oxide content of about 5 to 30% by weight with reference to the total weight of the catalyst.

The reaction can be carried out under normal or increased pressure, for example at 1 to 100 atmospheres, advantageously at 10 to 30 atmospheres with rigidly-arranged catalysts or catalysts in fluidized motion, if desired with the addition of inert gases, such as nitrogen, hydrogen or carbon dioxide, at elevated temperature in the gaseous or also in the liquid phase. The co-employment of inert gases is especially suitable when in the vaporization of the terpenes when working in the gas phase it is desired to reduce the partial pressure to avoid the formation of polymers. The reaction proceeds best at 150° to 450° C.; in the gas phase it is preferably to work at 280° to 350° C. and in the liquid phase at 200° to 300 C.

The reaction may be carried out for example by introducing the initial vaporous bicyclic terpene, if desired together with inert gases, into a tube filled with the catalyst and heated to the reaction temperature, and condensing the gases leaving the other end of the tube. It has been found to be advantageous to supply 0.1 to 0.6 part of the bicyclic initial terpene per hour per part by weight of catalyst. When working in the liquid phase, the process may be carried out by the sump or trickling method. In the trickling method the initial material, for example turpentine, is led down-wardly through the reaction tower which is filled with catalyst or contains the catalyst arranged in one or more layers. When co-employing inert gases, these may be led through the reaction chamber in co-current or countercurrent to the introduced turpentine. In the sump method the reaction chamber containing the catalyst is filled with turpentine and during the reaction turpentine is continually supplied at the bottom and the isomerization product withdrawn at the top of the reaction vessel. The procedure may also be that the catalyst is suspended in the initial material and the mixture is continually suplied to the reaction chamber, the catalyst being recovered from the reaction product leaving the reaction chamber.

Depending on whether the manganese oxide is used as such or applied to an inert carrier or surface-active material, it is possible to obtain preferentially dipentene or alpha-terpinene. When manganese oxides, for example pyrolusite are used or the manganese oxide is applied to an inert carrier, for example pumice, mainly dipentene is obtained, whereas activated manganese oxides or manganese oxides applied to surface-active substances lead to alpha-terpinene.

The following examples will further illustrate this invention but the invention is not restricted to these Examples. The parts are by weight.

Example 1

500 parts of a catalyst which has been obtained by impregnating 1,000 parts of kieselguhr with an aqueous solution of 300 parts of manganese nitrate, drying and heating in a current of air at 400° C., are charged into a tube, heated to 300° C., of which the diameter and length are in the ratio 1:50. 60 to 65 parts of turpentine per hour are introduced in the vapour phase and the vapours leaving the lower end of the tube are condensed. The reaction mixture contains 16% of camphene and tricyclene as first runnings, 60% of alpha-terpinene, 18% of paracymene containing small amounts of dipentene, and about 6% of residue.

Example 2

1,000 parts of the catalyst described in Example 1 are charged into a vertically arranged pressure tube and trickled at a temperature of 250° C. with 130 parts per hour of turpentine under its own vapour pressure of about 13 atmospheres. The isomerized mixture withdrawn at the lower end of the tube contains 14% of camphene, 50% of alpha-terpinene, about 14% of paracymene with small amounts of dipentene and about 22% of polymeric residue.

Example 3

1,000 parts of turpentine are heated with 40 parts of pyrolusite in a pressure stirring vessel for 2 hours at 250° C. while stirring. After separating the catalyst, there are obtained by distillation of the reaction mixture, besides 70 parts of first runnings boiling up to 176° C., 640 parts of dipentene, 90 parts of allo-ocimene (boiling point 195° C.) and 200 parts of diterpenes boiling above 300° C.

What we claim is:

1. A process for the production of at least one monocyclic terpene having para-structure selected from the group consisting of alpha-terpinene and dipentene which comprises treating a bicyclic terpene selected from the group consisting of turpentine, alpha- and beta-pinenes at a temperature between 150° and 450° C. and a pressure between 1 and 100 atmospheres with a catalyst containing a manganese oxide.

2. A process as claimed in claim 1 in which the catalyst is applied to an inert carrier.

3. A process as claimed in claim 1 in which the catalyst is applied to a surface-active substance.

4. A process as claimed in claim 1 in which the manganese oxide content of the catalyst is 5 to 30% by weight with reference to the total weight of the catalyst.

No references cited.